INVENTOR.
J K HUTCHENS,
BY
Roy E Raney
ATTORNEY.

United States Patent Office 2,987,322
Patented June 6, 1961

2,987,322
SUPPORT STRUCTURE FOR DIRIGIBLE WHEEL
J K Hutchens, 153 Hanley Road, St. Joseph, Mich.
Filed Apr. 22, 1958, Ser. No. 730,147
7 Claims. (Cl. 280—96.3)

The present invention relates to an improved structure for supporting a dirigible or steered wheel of a ground vehicle so that the steering axis of the wheel lies substantially in the center plane thereof.

An object of the invention is the provision of an improved support structure for a dirigible wheel of a ground vehicle comprising a hub on which the wheel is journaled, the hub being pivotally supported between two generally horizontal and vertically spaced mounting arms on the vehicle by two sets of ball and socket bearing members disposed in recesses in opposite sides of the hub and which form a pivot for turning the hub about an axis lying substantially in the center plane of the wheel, the hub being secured in a readily detachable manner to the arms by two screw plugs threaded in coaxially aligned openings through the outer portions of the arms, the axis of which openings define the steering axis of the wheel, so that the plugs may be rotated by a suitable tool and thereby caused to move axially into or out of locking engagement with a bearing member of the respective bearing sets, the inner ends of the plugs and the respective bearing members engaged thereby having annular locating surfaces which cooperate to accurately center the bearings on the steering axis and to tightly lock the hub and wheel to the mounting arms in a pivotal relationship. By this arrangement, the ball and socket bearing members can be completely assembled in the hub prior to positioning the latter between the mounting arms, and only relatively slight axial movements of the plugs are required to lock and release the hub so that parts of the wheel, such as the brake drum, can closely overlie the plugs without interfering with the locking and unlocking actions of the plugs and the wheel need not be removed from the hub in order to attach or disconnect the hub to the arms or to adjust the pressure of the plugs on the bearings.

A still further object of the invention is to provide substantial contacting surfaces between the plug and the bearing member engaged thereby, which surfaces provide a drive connection to cause the bearing member to rotate with the plug as pressure is applied to the member by the plug, whereby a predetermined torque applied to the plug is not expended in overcoming friction between the plug and the bearing member so that a relatively accurate loading on the bearing may be had by use of a torque wrench to turn the plug.

Another object of the invention is the provision of a supporting structure for a dirigible wheel of a vehicle of the character described in which the sets of bearing members for pivotally attaching the hub to the mounting arms comprise two blocks each having semi-spherical recesses or sockets therein, the sides of the blocks being tapered to nest in correspondingly tapered or flared openings formed in opposite sides of the hub, and each socket receives a semi-spherical ball portion of a second bearing member which has an outwardly facing annular surface which is engaged by the inner ends of the plugs threaded in the arms, as described. The engaging surfaces of the semi-spherical bearing members and the plugs form interlocking parts which are engaged and released by relatively slight axial movements of the respective plugs in the threaded openings of the arms. By this construction, the bearing members may be conveniently handled to facilitate the accurate and economical fabrication thereof and they may be readily assembled in the hub. The flared openings in the hub in which the bearing members nest may be accurately formed by first boring a pilot opening through the hub by a drill and then by using this pilot opening as a guide, the tapered openings are drilled. Thus, the stable alignment of the bearings is assured although any of the bearing parts may be readily replaced, if necessary, without disassembly of the wheel.

A still further object of the invention is the provision of support structure for a dirigible wheel of the character mentioned in which each bearing engaging plug is locked against inadvertent rotation by a wrench-like element having an out-of-round shaped part at one end extending into a corresponding shaped recess in the outer end of the plug, the other end of the element being secured, as by bolts, to the arm in which the respective plugs are threaded. In the preferred form of the invention, the plugs have a bearing lubricant passage therethrough and the portion of the securing element in the recesses in the respective plugs has a lubricant applicator fitting attached thereto by which lubricant is directed to the bearing members through the plugs.

Other objects and advantages of the invention will be apparent from the following description of a preferred form theerof, reference being made to the accompanying drawings wherein FIG. 1 is a view, partly in section, of a dirigible wheel of a motor road vehicle, such as a truck, showing the improved wheel supporting structure;

Figure 1:
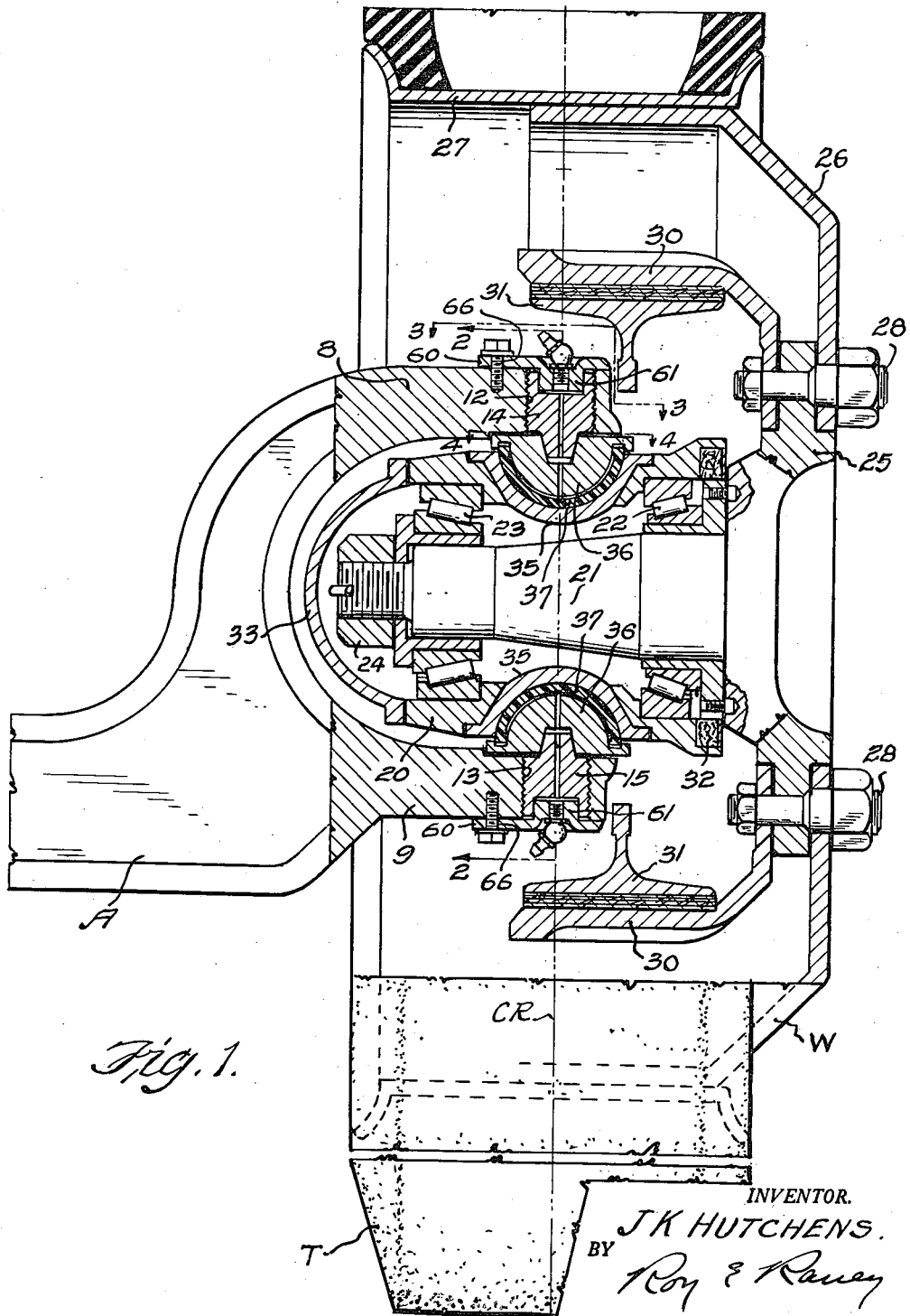

Referring to the drawings, a preferred form of the invention is shown embodied in the front wheel support for a motor truck, not shown, and includes a front axle A which is attached by springs to the truck in any conventional manner, not shown. Both front wheels of the truck are supported in like manner on the ends of the axle, and to simplify the disclosure only one wheel W is shown and described. The end of axle A shown has two general horizontal and vertically spaced mounting arms 8, 9 having machined surfaces 10 facing one another and providing accurate seats for bearing members described hereinafter. The undercut portions have coaxial threaded openings 12, 13 formed therethrough respectively.

Screw plugs 14, 15 are threaded into the respective openings, and the inner end 16 of each plug is of reduced diameter and tapered and the outer end has an out-of-round recess 17, preferably hexagonal in cross-section. An axial bore 18 is provided through each screw plug to provide a lubricant passage, the purpose of which is described more fully hereinafter. It is to be noted that the reduced position 16 results in a relatively wide annular face 19, the purpose of which will be made apparent hereinafter.

A tubular hub 20 is provided in which wheel W is journaled by a spindle 21 integral with the wheel and journaled in two roller bearings 22, 23 mounted in the hub, the spindle being secured in place by a nut 24 threaded on the end thereof, as shown and which is well known practice. It will be understood that the hub has an arm attached thereto to which suitable steering linkage is connected for swinging the hub about a steering pivot described hereinafter, but since such linkage is well known it is not shown here.

The outer end of spindle 21 has a flange 25 to which an annular wheel member 26 is bolted, which member has the usual tire rim 27 attached integral therewith, and a tire T is conventionally mounted to the rim. Likewise, a brake drum 30 is bolted to axle flange 25, and brake shoes 31 cooperate with the drum as is well understood in the art. Wheel member 26 and brake drum 30 are attached to the hub flange by common bolts and nuts 28. Brake covers could be employed but are omitted here for sake of clarity of the disclosure. It will be noted that brake drum 30 and brake shoes 31 overlie plugs 14, 15.

Preferably, a conventional oil seal 32 is disposed between the outer end of hub 20 and spindle 21, and a cap 33 is attached over the opposite end of the hub so that bearings 22, 23 may run in oil contained inside the hub by the cap and seal.

To provide for steering of wheel W by the steering linkage mentioned, hub 20 is pivotally journaled between arms 8, 9 on a steering axis coincident with the center plane of wheel W, which is indicated by broken line CR, by two sets of ball and socket bearing members recessed in opposite sides of the hub. Each set of these bearing members comprises a block 35 having a semi-spherical recess or socket formed therein and a semi-spherical bearing member 36 which fits into the socket, and a liner 37 of suitable material, such as nylon, is interposed between the walls of the recesses and members 36 to provide a desirable bearing surface. The outer sides of members 35 are tapered and nest in correspondingly tapered or flared openings 38 formed in opposite sides of hub 20, as may be clearly seen in FIG. 2. These tapered openings are preferably formed by first boring a pilot opening through opposite sides of the hub by a single drilling operation to assure axial alignment of the openings, after which the flared opening may be formed in accurate alignment by a drill using the pilot openings as guides. Members 35 each has a flange 39 which seats in undercut portions 40 surrounding each flared opening 38 and the flanges are bolted to hub 20 by bolts 41. It is to be understood that the tapered sides of blocks 35 and the flared surfaces of openings 38 are coaxially formed so as to be axially aligned with the steering axis, as will appear hereinafter. Each bearing member 36 has a flange 44 which overhangs flanges 39 of the respective bearing blocks 35 and an annular groove 45 is formed in each flange 44 to receive the open end edges of bearing liner 37 as may be seen in FIG. 2, to form a dirt seal. To assure accurate axial alignment of bearing members 36 with plugs 14, 15, a tapered recess 47 is formed in the center of each member coaxially thereof and is adapted to receive the tapered end portions 16 of the plugs. As may be seen best in FIG. 2, the tapered ends 16 of plugs 14, 15 nest in the tapered recesses 47 and fall short of the bottoms thereof so that shoulders 19 will engage the outer faces of flanges 44, respectively, and provide driving contact between the plugs and the respective bearing members 36 engaged thereby so that when the plugs are rotated to apply pressure to the bearings, members 36 will rotate therewith thereby obviating frictional drag between the plugs and members. By avoiding friction between plugs 14, 15 and members 36, relatively accurate and controlled loading of the bearings may be achieved by use of a torque wrench in turning the plugs. By controlling the load applied to the bearings, maximum stability is provided with a minimum of wear between the bearing members.

By this construction, blocks 35 may be relatively easily machined and the liners 37 may be vulcanized or otherwise attached in the recesses of blocks 35 before the blocks are attached to the hub, and in the event the liners should require replacement for any reason, a fresh block with liner attached may easily replace the old one. Thus, the bearing members may be fabricated separately from the hub and accurately assembled therein, thereby facilitating the manufacture of the hub and bearings.

Figure 2:
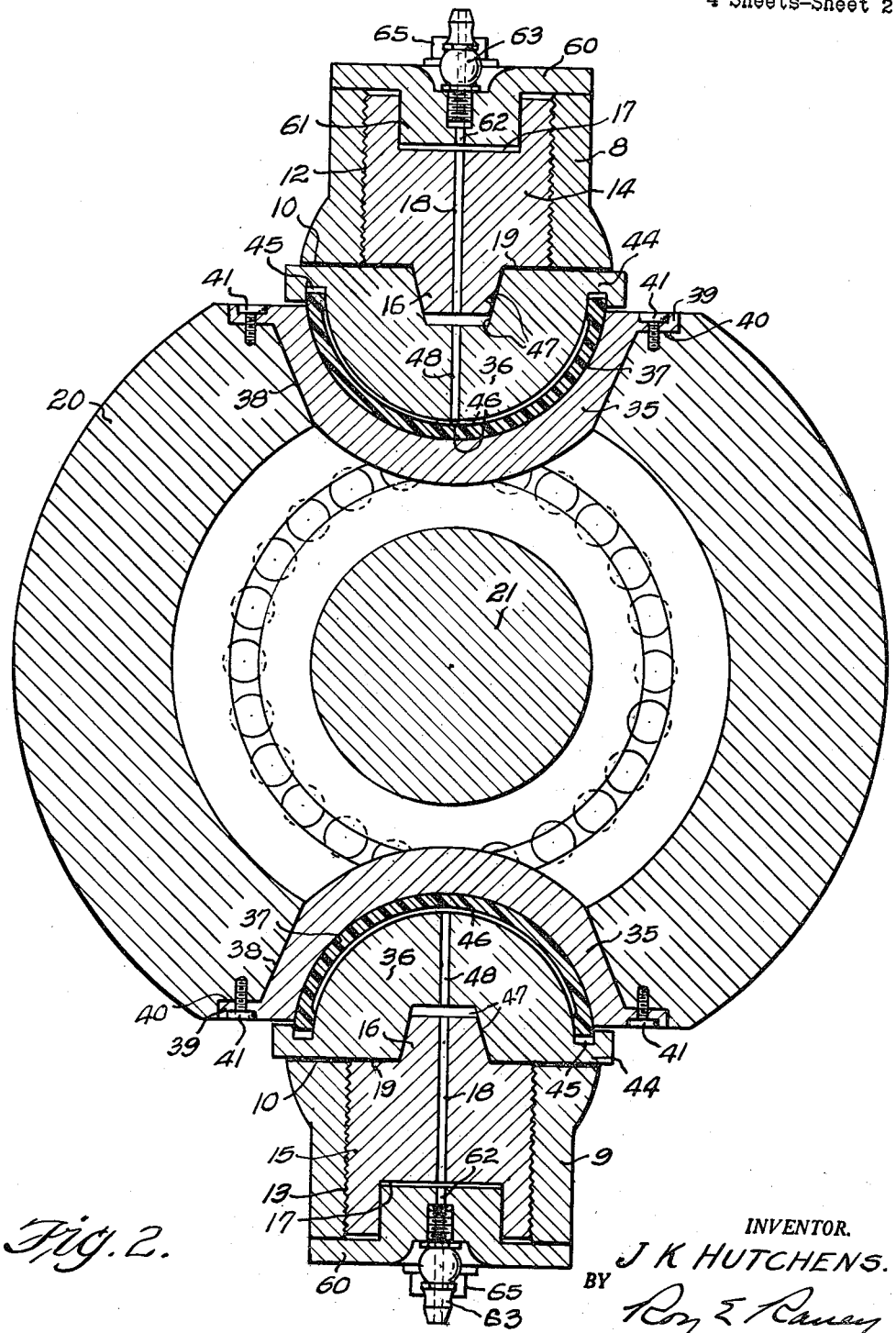
FIG. 2 is a sectional view taken on line 2—2 of FIG. 1, but on a larger scale.
Figure 3:
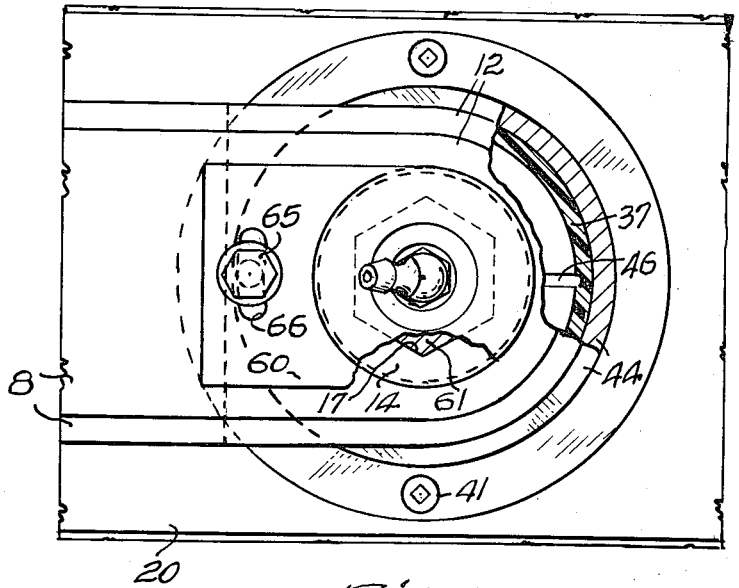
FIG. 3 is a view, showing certain parts broken away, taken along line 3—3 of FIG. 1, but on a larger scale.
Figure 4:
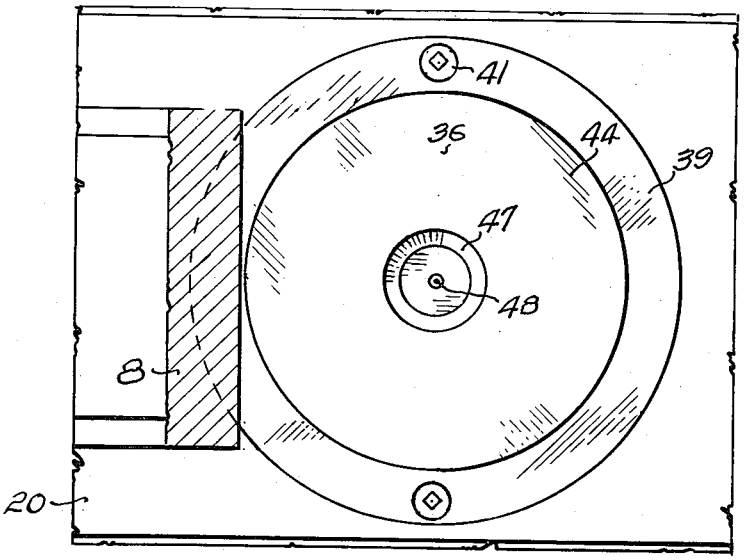
FIG. 4 is a sectional view taken along line 4—4 of FIG. 1, but on a larger scale.

Preferably, provision is made to lubricate the bearing surfaces between members 36 and liners 37 and accordingly bearing liners 37 have grooves 46 in the inner faces thereof which are at right angles to one another and intersect at the center thereof and each member 36 has an axial opening 48 bored therethrough which opens into the intersection of grooves 46, as is seen in FIG. 2. Lubricant is directed into openings 48 in a manner described more fully hereinafter.

Figure 5:
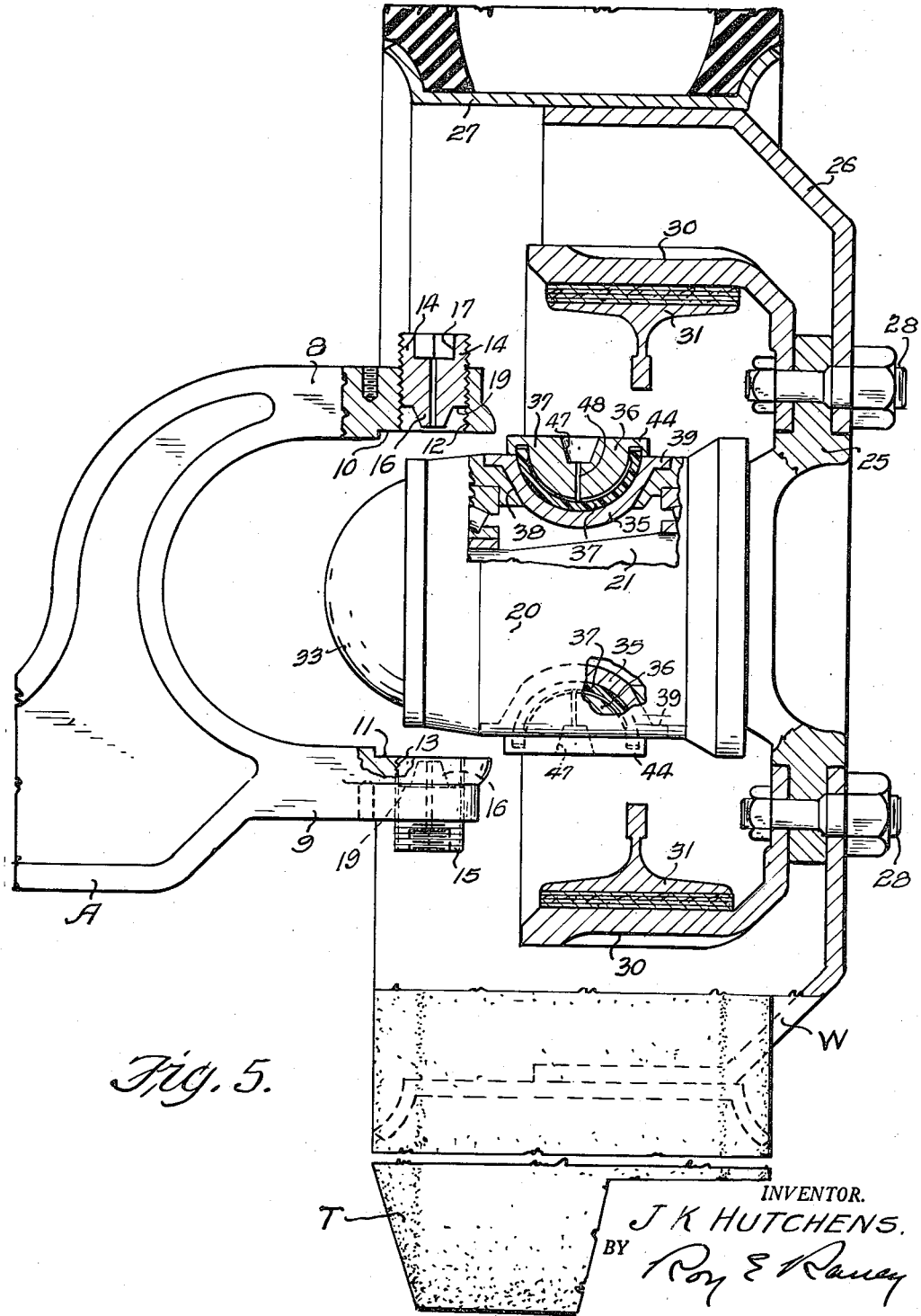
FIG. 5 is a view similar to FIG. 1, but showing the wheel in the process of being removed from or being attached in place on the mounting arms.

It will be seen that to attach wheel W to axle A, plugs 14, 15 are threaded in their respective openings 12, 13 to adjust their positions so that the inner ends thereof are approximately even with the inner faces of the arms at the openings, as may be seen in FIG. 5. Hub 20 with wheel W attached thereto and having the two sets of bearing members 35, 36 assembled therein, is inserted between arms 8, 9 with the inner edges of members 36 engaging the inner edges of faces 10. Plugs 14, 15 are then threaded inwardly by a suitable torque wrench having a hexagonal projection thereon which extends into the hexagonal openings 17 in the plugs, and inner ends 16 of the plugs enter into tapered openings 47 of members 36 and thereby accurately center and firmly lock the hub between arms 8, 9 on the axis of openings 12, 13 and shoulders 19 engage flanges 44 to form a driving connection between the plugs and bearing members 36. Plugs 14, 15 are then tightened until a suitable pressure is established to cause bearing members 36 to fit snugly against the liners 37, thus assuring a stable, pivotal support for the hub and wheel.

After plugs 14, 15 have been properly adjusted they are locked in position by locking elements 60, each of which consists of a plate-like member having a hexagonal projection 61 at one end which fits within the hexagonal recess 17 of the plugs. Elements 60 are drilled as at 62 to provide a lubricant passage, and a suitable lubricating gun nipple 63 is threaded into passage 62 so that lubricant fed through the nipple can be forced through passages 62, 18, 48 and 46 and spread between the engaging bearing surfaces of liners 37 and members 36. Elements 60 are retained in position on the respective arms 8, 9 by bolts 65 which extend through arcuate openings 66 in the elements and are threaded into openings in the respective arms as may be seen in FIGS. 1 and 2. Openings 66 are formed on the radius of the axis of plugs 14, 15 so that elements 60 can be locked into whichever angular position it is necessary to set the elements to cause projections 61 to engage in recesses 17 of the plugs. Thus, once plugs 14, 15 are secured in place by elements 60 they remain locked in position.

Should bearing members 35, 36 require tightening due to wear, etc., plugs 14 and 15 may easily be tightened by removing the respective locking elements 60 and inserting the turning wrench mentioned between brake drum 31 and the outer ends of the plugs.

In the event it is desirable to inspect the bearing members for possible replacement, it is only necessary to back plugs 14, 15 outwardly by rotation thereof in the threaded openings merely far enough to release or disengage the end portions 16 of the plugs from the corresponding recesses 47 of bearing members 36 whereby hub 20 with wheel W assembled thereto may be withdrawn from between arms 8 and 9. It will be seen from FIG. 5 that but a slight axial movement of the plugs is necessary to release the hub so that the brake drum overlying the plugs do not interfere with the operation described.

It will be noted that the bearing members 36 and liners 37 can be lubricated through nipples 63 without disturbing any parts of the supporting structure and that dirt and other foreign matter is prevented from entering between the bearing surfaces by the seal formed by the outer edges of liners 37 engaging closely in grooves 45.

It will be seen that the objects of the invention have been accomplished and although but one preferred form has been shown, it will be apparent that other forms, modifications and adaptations of the invention may be made without departing from the scope thereof as defined in the claims which follow.

I claim.

1. A pivotal support structure for a dirigible wheel comprising a hub rotatably supporting the wheel, two generally horizontal mounting arms vertically spaced to receive said wheel hub therebetween, said hub carrying two sets of oppositely disposed coaxial bearings recessed in the sides of said hub, said bearings each including a semi-spherical socket and a semi-spherical member seating in said socket, said arms having coaxial threaded openings therethrough, and screw plugs threaded in the respective said openings and engageable with the respective semi-spherical members, said plugs and members having inter-engaging parts, including tapered surfaces, for locking said plugs with said respective members when said plugs are threaded into said openings a predetermined extent to prevent lateral displacement of said hub and arms, said plugs separating from said members when said plugs are threaded outwardly in said openings a predetermined extent to permit lateral displacement of said hub and arms.

2. A pivotal support structure as set forth in the preceding claim characterized in that said inter-engaging parts comprise tapered inner end portions on said screw plugs of reduced diameter whereby annular faces at the bases of said portions are provided and said semi-spherical members have tapered recesses to receive said tapered end portions of said plugs and annular faces surrounding said recesses, the annular faces on said plugs and semi-spherical bearing members being engageable to form a driving connection between the respective plugs and bearing members when said tapered portions of said plugs enter into the respective said recesses.

3. A pivotal support structure for a dirigible wheel comprising a hub rotatably supporting the wheel, an axle having two vertically spaced bearing mounting members to receive said wheel hub therebetween, at least one of said mounting members comprising an arm, said hub carrying two oppositely disposed coaxial bearings at least one of which is recessed in the side thereof and adjacent to said arm, the last mentioned bearing comprising a socket type bearing member and a male bearing member complementary to said socket member and seated therein for supporting the wheel on a steering axis, said male member having the outer face confronting but slightly spaced from said arm, said arm having a threaded opening therethrough aligned with said outer face of said male bearing member, and a screw plug threaded in said opening and having the inner end portion engageable with said outer face of said male bearing member, said plug end portion and outer face of said bearing member having tapered nesting surfaces for locking said plug with said bearing member when said plug is threaded into said opening a predetermined extent to prevent lateral relative displacement of said hub and arm, the end portion of said plug being withdrawn from engagement with said outer face of said male bearing member by threading said plug outwardly in said opening while a substantial portion thereof remains threaded in said opening.

4. A pivotal support structure for a dirigible wheel comprising, a hub rotatably supporting the wheel, two generally horizontal mounting arms vertically spaced to receive said wheel hub therebetween, said hub carrying two sets of oppositely disposed coaxial bearings recessed in the sides thereof, said bearings each including a socket type bearing and a male bearing member complementary to said socket bearing and seated therein for supporting the wheel on a steering axis, said male members having the outer faces confronting but spaced from the respective mounting arms, said arms having coaxial threaded openings therethrough and aligned with said outer faces of said bearing members, and screw plugs threaded in the respective said openings and having end portions engageable with said outer faces of said male bearing members respectively, said plug end portions and outer faces of said bearing members having tapered nesting surfaces for locking said plugs with said respective bearing members when said plugs are threaded into said openings a predetermined extent to prevent lateral relative displacement of said hub and arms, the end portions of said plugs withdrawn from engagement with said outer faces of said male bearing members by threading said plugs outwardly in said openings while a substantial portion of said plugs remain threaded in said openings.

5. In a pivotal support structure for a dirigible wheel comprising, an axle, a hub rotatably supporting a wheel, bearing means between said axle and hub for supporting said hub on a steering axis and comprising a socket bearing member in a side of said hub, a socket form bearing liner fitting into said socket member and having the edges of the open side thereof spaced from said socket member, a male bearing member adapted to project into and fit in said bearing liner, said male bearing member having an annular groove in a portion outside said liner and receiving said open edges of said liner therein, and a lubricant passage formed in said male bearing member and opening between the confronting surfaces of said male bearing member and said liner.

6. In a pivotal support structure for a dirigible wheel comprising, an axle, a hub rotatably supporting a wheel, said axle including an arm projecting alongside said hub, bearing means between said axle arm and hub for supporting said hub on a steering axis and comprising a socket bearing member in a side of said hub, a socket form bearing liner fitting into said socket and attached thereto, said bearing liner having the edges of the open side thereof spaced from said socket member, a male bearing member adapted to project into and fit in said bearing liner, said male bearing member having an annular groove in a portion outside said liner and receiving said open edges of said liner therein, said male member having a tapered recess surrounded by an annular surface in a plane normal to the axis of said tapered recess, said arm having a threaded opening therethrough, and a plug threaded in said opening and having a tapered end portion projecting into said recess of said male bearing member, and an annular shoulder surrounding said tapered portion and engaging said annular surface surrounding said recess, said tapered portions and annular surfaces of said bearing member and plug forming a drive connection between said plug and bearing member.

7. A pivotal support structure for a dirigible wheel including a hub for rotatably supporting said wheel and comprising a tubular member having opposed coaxial outwardly flaring openings through opposite walls, a tapered bearing block removably positioned in each of said flared openings, each of said blocks having an outwardly facing socket recessed therein, two male bearing members fitted in said sockets respectively and each having a plane surface facing outwardly and said surfaces each having a recess therein, two generally horizontal mounting arms vertically spaced apart to receive said hub therebetween and each having a plane surface facing the other arm, said arms having coaxial threaded openings therethrough and opening in said plane surfaces, and screw plugs threaded into said openings and adapted to extend beyond said plane surfaces of said arms and engage said bearing members in said recesses in said surfaces to lock said hub in position between said arms.

References Cited in the file of this patent
UNITED STATES PATENTS

| | | |
|---|---|---|
| 1,438,214 | Brady et al. | Dec. 12, 1922 |
| 1,471,575 | Simons | Oct. 23, 1923 |
| 2,297,182 | Weiss | Sept. 29, 1942 |
| 2,693,587 | Davidson | Nov. 2, 1954 |
| 2,785,907 | Hutchens | Mar. 19, 1957 |
| 2,817,407 | Kost et al. | Dec. 24, 1957 |
| 2,823,055 | Booth | Feb. 11, 1958 |